United States Patent [19]
Oyama et al.

[11] Patent Number: 5,556,919
[45] Date of Patent: Sep. 17, 1996

[54] RUBBER COMPOSITION COMPRISING NITRILE GROUP-CONTAINING HIGHLY SATURATED COPOLYMER RUBBER AND ETHYLENICALLY SATURATED COPOLYMER RUBBER

[75] Inventors: Motofumi Oyama, Yokosuka; Kazuyoshi Nakajima, Tokyo, both of Japan

[73] Assignee: Nippon Zeon Co., Ltd., Tokyo, Japan

[21] Appl. No.: 486,261

[22] Filed: Jun. 7, 1995

[30] Foreign Application Priority Data

Sep. 30, 1994 [JP] Japan .................... 6-261368

[51] Int. Cl.⁶ .............................. C08L 9/02; C08L 23/16
[52] U.S. Cl. .................... 525/189; 525/233; 525/237; 525/211; 525/238
[58] Field of Search ................. 525/189, 233, 525/237

[56] References Cited

U.S. PATENT DOCUMENTS

| | | | |
|---|---|---|---|
| 4,404,329 | 9/1983 | Maeda et al. | 525/329.2 |
| 4,405,756 | 9/1983 | Oyama et al. | 525/237 |
| 4,746,707 | 5/1988 | Fiedler et al. | 525/338 |
| 4,978,771 | 12/1990 | Fiedler et al. | 558/459 |
| 5,164,457 | 11/1992 | Kubo et al. | 525/338 |

FOREIGN PATENT DOCUMENTS

| | | |
|---|---|---|
| 0386499 | 9/1990 | European Pat. Off. |
| 0479083 | 4/1992 | European Pat. Off. |
| WO9422924 | 10/1994 | WIPO |

OTHER PUBLICATIONS

J. Soc. Rub.Ind., Jp vol. 59, No. 4 (1986), p. 210.
Abstract JP 10454038, Feb. 17, 1989.
Abstract JP 1045402, Feb. 17, 1989.
Abstract JP 1045405, Feb. 17, 1989.
Abstract JP 1045404, Feb. 17, 1989.

*Primary Examiner*—Vasu S. Jagannathan
*Attorney, Agent, or Firm*—Armstrong, Westerman, Hattori, McLeland & Naughton

[57] ABSTRACT

A rubber composition comprising (i) a nitrile group-containing highly saturated copolymer rubber, which is a product obtained by hydrogenating the conjugated diene portion of an unsaturated nitrile-conjugated diene copolymer, and (ii) an ethylene-α-olefin-non-conjugated diene copolymer rubber. The highly saturated copolymer rubber has an alkylthio group having 12 to 16 carbon atoms, which include at least three tertiary carbon atoms, and has a sulfur atom which is directly bound to at least one of the tertiary carbon atoms; and the highly saturated copolymer rubber further has a Mooney viscosity of 15 to 200 and an iodine value not larger than 80.

22 Claims, 2 Drawing Sheets

RUBBER COMPOSITION COMPRISING NITRILE GROUP-CONTAINING HIGHLY SATURATED COPOLYMER RUBBER AND ETHYLENICALLY SATURATED COPOLYMER RUBBER

BACKGROUND OF THE INVENTION (1) Field of the Invention

This invention relates to a rubber composition comprising a nitrile group-containing highly saturated copolymer rubber and an ethylenically saturated copolymer rubber.

The nitrile group-containing highly saturated copolymer rubber in the rubber composition of the present invention is characterized as having a specific alkylthio group and exhibiting good high-rate vulcanizability, and a vulcanizate made therefrom has high mechanical strength and low compression set.

(2) Description of the Related Art

In recent years, a nitrile group-containing highly saturated copolymer rubber (a typical example of which is a hydrogenation product of an acrylonitrile-butadiene copolymer) has attracted much attention as a rubbery material having good heat resistance, oil resistance and weather resistance.. Many nitrile group-containing highly saturated copolymer rubbers have heretofore been proposed. For example, a hydrogenated acrylonitrile-conjugated diene copolymer rubber which is a hydrogenated product of an acrylonitrile-conjugated diene copolymer and has good ozone resistance and gasoline resistance is described in Japanese Unexamined Patent Publication (JP-A) No. 54-132647.

To enhance the ozone resistance and weather resistance of a nitrile group-containing highly saturated copolymer rubber, a proposal has been made wherein an ethylene-propylene rubber (hereinafter abbreviated to "EPR") is incorporated in the highly saturated copolymer rubber (JP-A-58-40332).

Both a nitrile group-containing highly saturated copolymer rubber and EPR have a low degree of unsaturation, and therefore, are difficult to vulcanize with a sulfur-containing vulcanizer and a vulcanizate thereof has a poor mechanical strength and a large compression set.

For injection molding of an acrylonitrile-conjugated diene copolymer rubber, a high fluidity and a high-rate vulcanizability, i.e., a high crosslinking efficiency at high-temperature and short-time vulcanization, are generally required. However, in general, the higher the vulcanization temperature, the lower the degree of crosslinking efficiency. Therefore injection-molded articles have poor tensile stress and impact resilience as compared with compression molded articles (for example, see Journal of Society of Rubber Industry, Japan, vol. 59, No. 4, p 214–215, 1986). This tendency is conspicuous in a hydrogenated acrylonitrile-conjugated diene copolymer rubber.

To impart a high-rate vulcanizability to a hydrogenated acrylonitrile-conjugated diene copolymer rubber, many proposals have been made, which include incorporation of vulcanization promotors such as a tellurium dithiocarbamate compound (JP-A-6-9822), a thiuram promotor plus a partial ester salt of a di- and/or tricarboxylic acid (JP-A4-264145) and a thiuram promotor plus N-trichloromethylsulphenylbenzenesulfanilide (JP-A-2-248442). However, the high-rate vulcanizability attained by these proposals is not on a high level and in some cases physical properties of the vulcanizate are deteriorated.

Further, contamination of a mold is conspicuous in the injection molding of a composition comprised of a hydrogenated acrylonitrile-conjugated diene copolymer rubber and an ethylenically saturated copolymer rubber, wherein vulcanization is carried out at a high temperature. That is, where the molding is repeated, staining materials are gradually deposited on the mold with the result of contamination of moldings and spoiling of the surface appearance. Therefore the mold must be cleaned at regular intervals, but the cleaning is time-consuming and costly and leads to reduction in productivity.

To avoid the contamination of a mold, proposals have been made wherein talc, sodium thiosulfate, carbon wax or silicone oil is incorporated in a rubber. However, it is difficult to avoid the mold contamination to any appreciable extent where the vulcanization is effected at a high temperature and a high rate as in injection molding.

SUMMARY OF THE INVENTION

In view of the foregoing, a primary object of the present invention is to provide a rubber composition comprising a nitrile group-containing highly saturated copolymer rubber and an ethylenically saturated copolymer rubber, which composition has good weather resistance, oil resistance and heat resistance, that are generally possessed by conventional rubber compositions comprising a nitrile group-containing highly saturated copolymer rubber an ethylenically saturated copolymer rubber; which composition can be vulcanized at a high rate and suitable for injection molding, and is capable of providing a vulcanizate having a good mechanical strength, exhibiting a reduced compression set and having no problem of mold contamination.

In accordance with the present invention, there is provided a rubber composition comprising (i) a nitrile group-containing highly saturated copolymer rubber, which is a product obtained by hydrogenating the conjugated diene portion of an unsaturated nitrile-conjugated diene copolymer, and (ii) an ethylenically saturated copolymer rubber; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

DESCRIPTION OF THE PREFERRED EMBODIMENTS

Nitrile Group-Containing Highly Saturated Copolymer Rubber

The nitrile group-containing highly saturated copolymer rubber used in the present invention is a product obtained by hydrogenating the conjugated diene portion of an unsaturated nitrile-conjugated diene copolymer having an alkylthio group having 12 to 16 carbon atoms, which include at least three tertiary carbon atoms, and having a sulfur atom which is directly bound to at least one of the tertiary carbon atoms. The nitrile group-containing highly saturated copolymer rubber has a Mooney viscosity of 15 to 200, preferably 30 to 100 and an iodine value not larger than 80, preferably not larger than 40. If the Mooney viscosity of the highly saturated copolymer rubber is smaller than 15, a satisfactory bonding strength cannot be obtained and the strength of vulcanizate is not high. If the Mooney viscosity exceeds 200, the moldability is reduced. There is no critical lower limit of the iodine value, but preferably the iodine value is at least 1 because, if the iodine value is too low, the vulcanization with a sulfur-containing catalyst becomes difficult.

The unsaturated nitrile-conjugated diene copolymer used for the preparation of the nitrile group-containing highly saturated copolymer rubber used in the present invention preferably contains 3 to 20% by weight of a fraction having a number average molecular weight (Mn) not larger than 35,000. If the fraction having an Mn not larger than 35,000 is too large, mechanical strength is reduced. Where the content of the fraction having an Mn not larger than 35,000 is 3 to 20% by weight, processability can be improved with the maintenance of high strength.

The ratio (Mw/Mn) of the weight average molecular weight (Mw) to the number average molecular weight (Mn) of the unsaturated nitrile-conjugated diene copolymer is usually in the range of 2.3 to 5.5, preferably 2.7 to 4. If the Mw/Mn ratio is too large, the processability is low even though the content of the fraction having an Mn not larger than 35,000 is adequate.

The unsaturated nitrile-conjugated diene copolymer preferably contains 10 to 60% by weight of bound unsaturated nitrile units. More preferable content is 20 to 50% by weight. The breadth (dAn) of compositional distribution of the unsaturated nitrile is usually not larger than 35, preferably in the range of 3 to 20, more preferably 5 to 15. If the distribution breadth is too large, the balance between the oil resistance and the cold resistance is lost.

The unsaturated nitrile-conjugated diene copolymer is preferably substantially free from halogen. The term "substantially free from halogen" used herein means that the content of halogens in the copolymer is smaller than about 3 ppm. The copolymer substantially free from halogen is beneficial, for example, in that a problem of metal corrosion does not arise when the copolymer as an adhesive is placed in contact with a metal.

As specific examples of the unsaturated nitrile, there can be mentioned acrylonitrile, methacrylonitrile and α-chloroacrylonitrile. As specific examples of the conjugated diene, there can be mentioned 1,3-butadiene, 2,3-dimethylbutadiene, isoprene and 1,3-pentadiene.

Provided that the object of the present invention is not injured, part of the unsaturated nitrile and the conjugated can be substituted by copolymerizable monomers. As specific examples of the copolymerizable monomer, there can be mentioned vinyl monomers such as styrshe, -methylstyfane and vinylpyridine; non-conjugated diene monomers such as vinylnorbornene, dicyolopentadiene and 1,4-hexadiene; alkyl acrylates and alkyl methacrylates having 1 to 18 carbon atoms in the alkyl group, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; alkoxyalkyl acrylates having 2 to 12 carbon atoms in the alkoxyalkyl group, such as methoxymethyl acrylate, methoxyethyl acrylate, ethoxyethyl acrylate, butoxyethyl acrylate, ethoxypropyl acrylate, methoxyethoxyethyl acrylate and ethoxybutoxyethyl acrylate; cyanoalkyl acrylates having 2 to 12 carbon atoms in the cyanoalkyl group, such as α- and β-cyanoethyl acrylate, α-, β- and γ-cyanopropyl acrylate, cyanobutyl acrylate, cyanohexyl acrylate and cyanooctyl acrylate; hydroxyalkyl acrylates such as 2-hydroxyethyl acrylate and hydroxypropyl acrylate; monoalkyl and dialkyl esters of unsaturated dicarboxylic acids such as monoethyl maleate, dimethyl maleate, dimethyl fumarate, diethyl fumarate, di-n-butyl fumarate, di-2-ethylhexyl fumarate, dimethyl itaconate, di-n-butyl itaconate and di-2-ethylhexyl itaconate; substituted alkyl esters of unsaturated carboxylic acids such as ethylaminomethyl acrylate, diethylaminoethyl acrylate, 3-(diethylamino)-2-hydroxypropyl acrylate and 2,3-bis(difluoroamino)propyl acrylate; fluoroalkyl acrylates and methacrylates such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodeoyl acrylate, trifluoroethyl methacrylate, tetrafluoropropyl methacrylate, octafluoropentyl methacrylate, dodecafluoroheptyl methacrylate, pentadecafluorooctylmethacrylate and hexadecafluorononyl methacrylate; fluoro-substituted benzyl acrylate and methacrylate such as fluorobenzyl acrylate, fluorobenzyl methacrylate and difluorobenzyl methacrylate; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- and p-trifluoromethylstyrene, vinyl pentafluorobenzoate, difluoroethylene and tetrafluoroethylene; and polyethylene glycol acrylate, polyethylene glycol methacrylate, polypropylene glycol acrylate, polypropylene glycol methacrylate, epoxy acrylate, epoxy methacrylate, urethane aorylate and urethane methacrylate. The amount of these copolymerizable monomers is not particularly limited, but is usually not larger than 80% by weight based on the total weight of monomers. Especially when high oil resistance and heat resistance are required, the amount of the copolymerizable monomer is not larger than 10% by weight.

Where an unsaturated carboxylio acid ester monomer or a combination thereof with a fluorine-containing vinyl monomer is copolymerized together with the unsaturated nitrile and the conjugated diene, cold resistance of the nitrile group-containing highly saturated copolymer rubber can be improved without deterioration of the ozone resistance and heat resistance. Especially unsaturated dicarboxylic acid dialkyl esters are preferable for this purpose. The amount of the unsaturated carboxylic acid ester or a combination thereof with a fluorine-containing vinyl monomer is 1 to 80% by weight, preferably 15 to 60% by weight, more preferably 20 to 40% by weight, based on the total weight of the monomers.

Of the unsaturated nitrile-conjugated diene copolymers used for the preparation of the nitrile group-containing highly saturated copolymer rubber, an acrylonitrile-butadiene copolymer (hereinafter abbreviated to "NBR") having a bound acrylonitrile content of 10 to 60% by weight, preferably 20 to 50% by weight, is advantageous. Commercially available acrylonitrile-butadiene copolymers having a wide variety of bound acrylonitrile contents can be used and the most adequate bound acrylonitrile content should be chosen depending upon the particular properties desired.

As the alkylthio group having 12 to 16 carbon atoms, which include at least three tertiary carbon atoms, and having a sulfur atom which is directly bound to at least one of the tertiary carbon atoms, there can be mentioned a 1,1-di(2,2-dimethylpropyl)-1-ethylthio group and a 1,1-di(2,2-dimethylpropyl) -1-(2,2,4,4-tetramethylpentyl)-1-ethylthio group. These alkylthio groups may be contained either alone or in combination in one molecule. Of these, a 1,1-di(2,2-dimethylpropyl)-1-ethylthio group is preferable.

The amount of the alkylthio group in the unsaturated nitrile-conjugated diene copolymer is usually at least 0.03 mole, preferably at least 0.07 mole, more preferably at least 0.09 mole, per 100 moles of the total monomer units in the copolymer. The upper limit of the alkylthio group content is usually 0.3 mole per 100 moles of the total monomer units in the copolymer. If the amount of the alkylthio group is too small, when the nitrile group-containing highly saturated copolymer rubber is vulcanized at a high temperature for a short time, e.g., at the step of injection molding, a high crosslinking efficiency cannot be obtained and thus the tensile stress and impact resilience cannot be improved. Namely the intended high rate of vulcanization cannot be effected. As an increase in the amount of the alkylthio group, the scorch time ($T_s$) is markedly shortened and the contamination of a mold is mitigated, and thus, the productivity in injection molding is enhanced. Especially when the content of the alkylthio group is at least 0.09 mole, the crosslinking efficiency is markedly improved, and the maximum torque in a vulcanization curve as obtained by measurement using an oscillating disc rheometer is drastically increased.

The unsaturated nitrile-conjugated diene copolymer is produced by a process wherein an unsaturated nitrile monomer and a conjugated diene monomer are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms.

The free radical initiator used is not particularly limited. As examples of the free radical initiator, there can be mentioned organic peroxides, radox polymerization initiators, azo compounds and parsulfates. These polymerization initiators are usually used in an amount of 0.005 to 3 parts by weight per 100 parts by weight of the monomers. The polymerization temperature is preferably in the range of 0° to 100° C.

As specific examples of the alkylthiol compound used as a molecular weight modifier for the production of the unsaturated nitrile-conjugated diene copolymer, there can be mentioned 2,2',4,6,6'-pentamethylheptane-4-thiol and 2,2',4,6,6',8,8'-heptamethylnonane-4-thiol. Of these, 2,2',4,6,6'-pentamethylheptane-4-thiol is preferable. A nitrile group-containing highly saturated copolymer rubber made from the unsaturated nitrile-conjugated diene copolymer made by using this alkylthiol compound exhibits excellent efficiency in high-rate vulcanization.

The alkylthiol compound as a molecular weight modifier can be used either alone or in combination. If desired, the alkylthiol compound can be used in combination with another molecular weight modifier which is conventionally used in a radical polymerization. In this case, the alkylthiol compound should be used in, an amount of at least 50% by weight, preferably at least 80% by weight, and more preferably at least 95% by weight, based on the total weight of the molecular weight modifiers.

As the molecular weight modifier which may be used in combination with the above-mentioned alkylthiol compound, there can be mentioned, for example, alkylthiol compounds such as 2,4,4-trimethylpentane-2-thiol, dodecane-12-thiol, 2,2,6,6-tetramethylheptane-4-methanethiol and 2,4,6-trimethylnonane-4-thiol; xanthogendisulfides such as dimethyl xanthogendisulfide, diethyl xanthogendisulfide and diisopropyl xanthogendisulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and acrolein, methacrolein, allyl alcohol, 2-ethylhexyl thioglycolate, terpinolene, α-terpinene, γ-terpinene, dipentene, α-methylstyrene dimer (which preferably contains at least 50% by weight of 2,4-diphenyl-4-methyl-1-pentene), 2,5-dihydrofuran, 3,6-dihydro-2H-pin, phthalan, 1,2-butadiene and 1,4-hexadiene.

The amount of the molecular weight modifier used for radical polymerization is usually 0.05 to 3 parts by weight, preferably 0.1 to 1 part by weight, based on 100 parts by weight of the monomer mixture for copolymerization. This amount is advantageous for desirably controlling the molecular weight of the copolymer.

By adding the molecular weight modifier in lots in the course of polymerization, a copolymer containing 3 to 20% by weight of e low-molecular weight fraction having a number average molecular weight (Mn) smaller than 35,000 can be obtained. This low-molecular weight copolymer has a good processability. In general, it is preferable that 10 to 95% by weight of the molecular weight modifier is incorporated in a monomer mixture before the commencement of polymerization and, when the conversion reaches,20 to 70%, the remainder is added to the polymerization mixture. The number of divided lots can be appropriately determined according to the need.

Instead of the addition of the molecular weight modifier in lots in the course of polymerization, two or more of polymers having different molecular weights can be mixed together, which are separately produced by using different amounts of the molecular weight modifier.

By using the above-mentioned alkylthioi molecular weight modifier, the conversion in radical polymerization can be enhanced to at least 75%, preferably at least 80%. Thus the nitrile rubber can be produced at a high productivity.

In a radical polymerization for the production of an unsaturated nitrile-conjugated diene copolymer, a branch-forming reaction or gelation generally becomes marked with an increase of the polymerization conversion. Where the resulting nitrile rubber is vulcanized, a high vulcanization efficiency cannot be obtained and the vulcanizate has poor physical properties such as tensile stress and impact resilience. t-Dodecyl mercaptan which is conventionally used as a molecular weight modifier in a radical polymerization for nitrile rubbers is a mixture of alkylthiol compound isomers having 9 to 16 carbon atoms. Where this mixture is used as a molecular weight modifier, the resulting nitrile rubbers are difficult to vulcanize at a high rate when they are subjected to a high-temperature and short-time vulcanization, for example, when injection-molded.

In contrast, in the process for producing the unsaturated nitrile-conjugated diene copolymer using the above-mentioned alkylthiol molecular weight modifier, even when the polymerization conversion is high, e.g., 80% or higher, the resulting nitrile rubber can be vulcanized at a high rate, and thus, the maximum torque in a vulcanization curve as obtained by measurement using an oscillating disc rheometer is high.

The entire amount of the monomers can be charged at once in a reactor before the commencement of polymerization. Alternatively, 30 to 90% by weight of the monomers can be charged before the commencement of polymerization and, when the polymerization conversion reaches 20 to 70% by weight, the remainder monomers are added to a polymerization mixture. The nitrile rubber made by this divided monomer addition method is characterized as having good and balanced oil resistance and cold resistance.

The kind and amount of monomers added in lots can be appropriately varied depending upon the intended content of bound unsaturated nitrile and the breadth ($\Delta AN$) of compositional distribution of unsaturated nitrile. For example, where a bound nitrile content of smaller than 37% is intended, part of the unsaturated nitrile is usually added to the reaction mixture during polymerization., Where a bound nitrile content of at least 37% is intended, part of the conjugated diene is usually added to the reaction mixture during polymerization. The number of monomer addition can be appropriately determined according to the need.

The procedure by which the polymerization is effected is not particularly limited, and an appropriate procedure can be chosen from bulk polymerization, solution polymerization, suspension polymerization and emulsion polymerization. Of these, emulsion polymerization is preferable.

Where the unsaturated nitrile-conjugated diene copolymer is produced by an emulsion polymerization procedure, if a carboxylic acid type emulsifier is used, a problem of mold contamination does not arise at a high-temperature short-time vulcanization such as injection molding.

The carboxylic acid type emulsifier used includes, for example, fatty acid soap and rosin soap. As specific examples of the carboxylic acid type emulsifier, there can be mentioned fatty acid soap such as a sodium salt or a potassium salt of long-chain aliphatic carboxylic acids having 12 to 18 carbon atoms, for example, lauric acid, myristic acid, palmitic acid, stearic acid, oleic acid and mixtures thereof; and rosin soap such as a sodium salt or a potassium salt of a disproportionated or hydrogenated product of natural rosin such as gum rosin, wood rosin or tall oil rosin. The natural rosin contains as main ingredients abietic acid, levopimaric acid, palustric acid, dehydroabietic acid, tetrahydroabietic acid and neoabietic acid. The amount of the emulsifier is not particularly limited, but is usually in the range of 0.05 to 10 parts by weight, preferably 0.5 to 3 parts by weight, per 100 parts by weight of the monomers.

The emulsion polymerization for the unsaturated nitrile-conjugated diene copolymer can be carried out by a conventional procedure, and when the predetermined conversion is reached, polymerization is terminated by adding a short-stopper such as hydroxylamine or sodium carbamate. Unreacted monomers are removed, for example, by heating or steam distillation, and then, a coagulant is added in an emulsion polymerization, and which include an inorganic coagulant, a high-polymer coagulant or a heat-sensitive coagulant.

However, it is preferable that a nonionic surface active agent is incorporated in the copolymer latex as prepared in the above-mentioned manner, and then, the copolymer latex is introduced in a coagulating bath having a metal salt dissolved therein, and is heated whereby the copolymer latex is coagulated. By adopting this coagulating method, crumbs which have appropriate size and porosity and are capable of being easily dried. Further, by the addition of a nonionic surface active agent, the amount of a metal salt for coagulation can be reduced.

As specific examples of the nonionic surface active agent incorporated in the copolymer latex in the above-mentioned coagulating method, there can be mentioned an adduct of an alkylene oxide with an alkylphenol-formaldehyde condensate (for example, an oxyethylene-oxypropylene co-addition product), a polyoxyethylene alkyl ether, a polyoxyethylene alkyl-aryl ether, a polyoxyethylene fatty acid ester, a polyoxyethylene sorbitan fatty acid ester, polyoxyethylene-oxypropylene block copolymer, an alkylsulfinyl alcohol and a fatty acid monoglyceride. These nonionic surface active agents can be used either alone or in combination.

Of these nonionic surface active agents, an oxyethylene-oxypropylene co-addition product of an alkylphenolformaldehyde condensate is preferable. This co-addition product exhibits a good heat-sensitive gel effect. The co-addition product preferably has a cloud point of 10° to 100° C., more preferably 20° to 70° C. If the cloud point is too low, the handling property is not satisfactory. If the cloud point is too high, the heatsensitive gel effect becomes poor.

The amount of the nonionic surface active agent is preferably 0.01 to 5 parts by weight, more preferably 0.05 to 2 parts by weight, based on 100 parts by weight of the copolymer. When the amount is too small, the above-mentioned benefits cannot be obtained. Even when the amount exceeds 5% parts by weight, there is no substantial increase in the above-mentioned benefits.

As the metal salt to be incorporated in the coagulating bath, calcium chloride, sodium chloride and metal sulfates are usually used. Especially metal sulfates do not contain halogens and thus result in a nitrile group-containing highly saturated copolymer rubber which does not cause a problem of metal corrosion. As specific examples of the metal sulfates, there can be mentioned aluminum sulfate, magnesium sulfate and sodium sulfate. Of these, aluminum sulfate and magnesium sulfate are preferable.

The amount of the metal salt is preferably in the range of 0.5 to 50 parts by weight, more preferably 1 to 30 parts by weight,t based on 100 parts by weight of the copolymer. If the amount of the metal is too small, coagulation is insufficient and undesirably large crumbs are formed. If the amount of the metal salt is too large, the rate of coagulation varies depending upon the particular metal salt and the crumbs have a poor porosity.

When the coagulating bath having the copolymer latex introduced therein is heated to the cloud point of the nonionic surface active agent or higher, the copolymer latex coagulates. The nonionic surface active agent used preferably has a cloud point of 10° to 100° C. If the cloud point is too low, cooling is required for keeping the latex-incorporated coagulating bath below the cloud point. If the cloud point is too high, the latex-incorporated coagulating bath must be heated to a high temperature for coagulation.

The coagulated copolymer is recovered, washed with water and dried to give an unsaturated nitrile-conjugated diene copolymer, followed by hydrogenation to produce the nitrile group-containing highly saturated copolymer rubber.

The method by which the unsaturated nitrile-conjugated diene copolymer rubber is hydrogenated is not particularly limited, and a conventional method using a catalyst can be adopted. As specific examples of the catalyst for hydrogenation, there can be mentioned palladium/silica and a palladium complex (Japanese Unexamined Patent Publication [JP-A] No. 3-252405), and rhodium compounds and ruthenium compounds (JP-A 62-125858, 62-42937, 1-45402, 1-45403, 1-45404 and 1-45405). The amount of the catalyst is not particularly limited, but is usually 5 to 10,000 ppm based on the weight of copolymer.

Ethylenically Saturated Copolymer Rubber

The ethylenically saturated copolymer rubber used in the present invention is a copolymer of ethylene, α-olefin and a non-conjugated diene, which has a substantially saturated structure. More specifically the ethylenically saturated copolymer rubber is a copolymer having ethylene units, units of an α-olefin having 3 to 14 carbon atoms and non-conjugated diene units, which is non-crystalline or of a low degree of crystallinity, i.e., has a degree of crystallinity not larger than 20%, preferably not larger than 10%. As specific examples of the ethylenically saturated copolymer rubber, there can be mentioned an ethylene-propylene-non-conjugated diene terpolymer rubber, an ethylene-propylene-1-butene-non-conjugated diene copolymer rubber, and an ethylene-1-butane-non-conjugated diene tarpolymer rubber. These copolymer rubbers can be used either alone or in combination. Of these, an ethylene-propylene-non-conjugated diene tarpolymer rubber is preferable.

As specific examples of the non-conjugated diene, there can be mentioned dicyclopentadiene, 1,4-hexadiene, cyclooctadiene, methylnorbornene and 5-ethylidene-2-norbornene. Of these, dicyclopentadiene and 5-ethylidene-2-norbornene are preferable.

The ethylenically saturated copolymer rubber usually has a Mooney viscosity [$ML_{1+4}$ (100° C.)] of 10 to 180, preferably 40 to 140, and preferably has an iodine value not larger than 20.

The proportion of ethylene units to -olefin units in the copolymer rubber is usually in the range of 50/50 to 90/10 by mole, preferably 60/40 to 84/16 by mole, and the proportion of the sum of the ethylene units plus the α-olefin units to the non-conjugated. Diene units is usually in the range of 98/2 to 90/10 by mole, preferably 97/3 to 94/6.

The mixing ratio of the nitrile group-containing highly saturated copolymer rubber to the ethylenically saturated copolymer rubber in the rubber composition of the present invention is usually such that the highly saturated copolymer rubber is 95 to 20 parts by, weight, preferably 70 to 50 parts by weight, and the ethylenically saturated copolymer rubber is 5 to 80 parts by weight, preferably 30 to 50 parts by weight. If the relative amount of the nitrile group-containing highly saturated copolymer rubber is too large, the weather resistance is reduced. If the relative amount of the ethylenically unsaturated copolymer rubber is too large, the oil resistance is reduced.

The manner in which the nitrile group-containing highly saturated copolymer rubber and the ethylenically saturated copolymer rubber are mixed together is not particularly limited. For example, there are adopted a dry blending method wherein the two copolymer rubbers are mixed at a high temperature by using, for example, a Banbury mixer, and a latex co-precipitation method wherein the two copolymer rubbers are mixed together in latex forms, coagulated and dried, and the dried product is heat-treated by using, for example, an extruder or a Banbury mixer.

Vulcanizable Rubber Composition

A sulfur-containing vulcanizer is incorporated in the rubber composition of the present invention comprising the nitrile group-containing highly saturated copolymer rubber and the ethylenically saturated copolymer to provide a vulcanizable rubber composition. The vulcanizable rubber composition having a sulfur-containing vulcanizer incorporated therein exhibits an excellent high-rate vulcanizability.

As specific examples of the sulfur-containing vulcanizer, there can be mentioned sulfur such as powdered sulfur, flower of sulfur, precipitated sulfur, colloidal sulfur, surface-treated sulfur and insoluble sulfur, and sulfur-containing compounds such as sulfur chloride, sulfur dichloride, morpholine disulfide, an alkylphenol disulfide, N,N'-dithio-bis(hexa-hydro-2H-azepinon-2), sulfur-containing polysulfide and high-molecular weight polysulfide. Further, sulfur-containing vulcanization promoters such as tetramethylthiuram disulfide, selenium dimethyl dithiocarbamate and 2-(4'-morpholinodithio)benzothiazole are included.

In combination with the sulfur-containing vulcanizer, a vulcanization promoter can be used which includes, for example, zinc white or stearic acid; or a guanidine, aldehyde-amine, aldehyde-ammonia, thiazole, sulfenamide, thiourea or xanthate promoter.

The amount of the sulfur-containing vulcanizer is not particularly limited, but is usually in the range of 0.10 to 10 parts by weight, preferably 0.1 to 5 parts by weight, per 100 parts by weight of the total weight of the nitrile group-containing highly saturated copolymer rubber and the ethylenically saturated copolymer rubber. If the sulfur-containing vulcanizer is not contained or the content thereof is too small, the high-rate vulcanization cannot be effected at a high-temperature short-time vulcanization.

A vulcanizer other than the sulfur-containing vulcanizer such as an organic peroxide vulcanizer can be used in combination with the sulfur-containing vulcanizer. As the organic peroxide vulcanizer, there can be mentioned, for example, tert-butyl hydroperoxide, cumene hydroperoxide, di-tert-butyl peroxide, tert-butylcumyl peroxide, 2,5-dimethyl-tert-butyl peroxyhexane, 2,5-dimethyl-tert-butyl peroxyhexyne, 1,3-bis(tert-butyl peroxyisopropyl)benzene, p-chlorbenzoyl peroxide, tert-butyl peroxybenzoate, tert-butyl peroxyisopropylcarbonate and tert-butyl benzoate.

As other vulcanizers which can also be used in combination with the sulfur-containing vulcanizer, there can be mentioned polyfunctional compounds such as trimethylolpropane trimethacrylate, divinylbenzene, ethylene dimethacrylate and triallyl isocyanurate. Further, there can be mentioned a metallic soap/sulfuric vulcanizer, a triazine/dithiocarbamate vulcanizer, a polycarboxylic acid/onium salt vulcanizer, a polyamine vulcanizer such as hexamethylenediamine, triethylenetetramine, hexamethylenediamine carbamate, ethylenediamine carbamate or triethylenediamine, and an ammonium benzoate vulcanizer.

In the rubber composition, auxiliaries which are conventionally used in rubber compositions can be incorporated according to the need. Such auxiliaries include, for example, reinforcing materials such as various types of carbon black, silica and talc, fillers such as calcium carbonate and olay, processing aids, processing oils including plasticizers, antioxidants, and antiozonants.

Especially when the nitrile group-containing highly saturated copolymer rubber contains units of an ethylenically unsaturated carboxylic acid monomer such as acrylic acid, an oxide of a metal of group II of the periodic table can be incorporated in the rubber composition whereby a vulcanizate having an excellent dynamic fatigue resistance can be obtained.

As examples of the ethylenically unsaturated carboxylic acid monomer used for the preparation of the nitrile group-containing highly saturated copolymer rubber, there can be mentioned acrylic acid, mathacrylic acid, itaconic acid, fumaric acid, maleic acid and, monoesters of these dicarboxylic acids. The content of the ethylenically unsaturated carboxylic acid units is preferably in the range of 0.1 to 15% by weight based on the weight of the copolymer, in view of the strength and dynamic fatigue resistance. When the content is smaller than 0.1% by weight, the intended high fatigue resistance and strength cannot be obtained. When the content is too large, the water resistance is reduced.

As examples of oxides of metal of group II of the periodic table, there can be mentioned magnesium oxide, zinc oxide, calcium oxide and strontium oxide. Of these, zinc oxide and magnesium oxide are preferable. The amount of the metal oxide is preferably 0.5 to 30 parts by weight per 100 parts by weight of the highly saturated copolymer rubber.

If desired, other rubbers can be incorporated in combination with the nitrile group-containing highly saturated copolymer rubber in the rubber composition of the present invention, which include, for example, an acrylic rubber, a fluororubber, a styrene-butadiene copolymer rubber, natural rubber and a polyisoprene rubber.

The procedure by which the vulcanizable rubber composition of the present invention is prepared is not particularly limited. Usually the rubbery materials, a vulcanizer and other ingredients are mixed and kneaded by a conventional mixer such as a roll mixer or a Banbury mixer.

The rubber composition of the present invention can be fabricated into final rubbery articles, through vulcanization either as it is or as a composite thereof with a reinforcing fibrous material such as a polyester fabric, a nylon fabric, or a cord of glass fiber, aramid fiber, carbon fiber or steel fiber.

The invention will Now be described specifically by the following examples. Parts and % in the following examples and comparative examples are by weight unless otherwise specified.

Characteristics of copolymers, vulcanizable rubber compositions and rubber vulcanizates were determined as follows.

(1) Properties of copolymers (i) Bound nitrile content (%)

Bound nitrile content was determined by measuring the content of nitrogen in the copolymer by the Kjeldahl method according to JIS K6384, and calculating the bound nitrile content from the nitrogen content.

(ii) Mooney viscosity

Measurement was carried out at 100° C. on about 40 g of a copolymer sample according to JIS K6383.

(iii) Molecular weight and molecular weight distribution

Number average molecular weight (Mn) and weight average molecular weight (Mw) of a copolymer before hydrogenation in terms of those of standard polystyrene were measured by gel permeation chromatography using tetrahydrofuran as a solvent. The proportion (%) of the fraction having an Mn not larger than 35,000 to the total weight of the copolymer was calculated as the ratio (%) of the area of said fraction to the entire area of the molecular weight distribution.

(iv) Breadth ($\Delta AN$) of the compositional distribution of unsaturated nitrile Determination of $\Delta AN$ was made on the copolymer before hydrogenation by using a high-speed liquid chromatography. The method of determination is described in Rubber Chemistry and Technology, vol. 63, [2] p181–191 (1990). Namely, chromatogram was prepared by a high-speed chromatography under the following conditions. $\Delta AN$ was the half-value width of the chromatogram. For the determination of $\Delta AN$, a calibration chart showing the relationship of the amount of eluate with the amount of unsaturated nitrile was prepared by using a copolymer sample containing a known amount of unsaturated nitrile.

(a) Column

Gel: crosslinked 2-chloroacrylonitrile/ethylene dimethacrylate copolymer

Diameter of gel particles: 2 to 6 μm

Column: made of stainless steel

Column diameter×length: 0.46 cm×25 cm (b) Eluting solution

At the initial chloroform/n-hexane ratio (30/70 by weight), the eluting solution was allowed to flow for 20 minutes and then, eluated from 30/70 to 100/0 in a gradient manner over a period of 30 minutes.

(c) Rate of flow: 0.5 ml/min.

(d) Concentration of sample: 1 wt. % in chloroform (e) Injectlob amount: 10 to 20 μl (f) Detector: light scattering mass detector Model 750/14 made by ACS Co.

(g) Instrument: Tri. Eotor VI made by Nippon Bunko K. K.

(v) Concentration (% by mole) of a 1,1-di(2,2-dimethylpropyl)-1-ethylthio group

Concentration of the ethylthio group in the copolymer before hydrogenation was determined as follows. The copolymer was dissolved in benzene, and then coagulated in methyl alcohol. This operation of dissolution and coagulation was repeated three times, and then the copolymer was purified. The purified copolymer was subjected to the measurement by NMR as follows. By measurement using $^1$H-NMR (400 MHz), a peak due to a proton of the terminal methyl group in the 1,1-di(2,2-dimethylpropyl)-1-ethylthio group was detected in the vicinity of 1.05 ppm. By measurement using $^{13}$C-NMR (100 MHz), a peak due to the C atom of —$CH_2$— group in said ethylthio group was detected in the vicinity of 54.6 ppm.

(12) Contamination of mold

An vulcanized rubber composition was prepared according to the recipe shown in Table 1, and the rubber composition was filled in a hole with a diameter of 12 mm of a metal plate having a thickness of 2 mm. The rubber composition-filled metal plate was sandwiched between two mild steel sheets (JIS G3141) each having a thickness of 1 mm. Then the rubber composition in the sandwiched metal plate was vulcanized at a temperature of 220° C. and a pressure of 20 kg/cm$^2$ for 2 minutes. The vulcanized rubber composition was removed and then an unvulcanized rubber composition was again filled in the hole of the metal plate, followed by vulcanization. This operation of removal of a vulcanized rubber composition, and filling and vulcanization of an unvulcanized rubber composition was repeated 50 times, and the contamination of the contact surface of each mild steel sheet was evaluated.

The degree of contamination was expressed by five ratings. Rating 1 means that there was no contamination on the mild steel sheets, and rating 5 means that the entire contact surface of each mild steel sheet was contaminated to the greatest extent.

TABLE 1

| Ingredients | Amount (parts by weight) |
| --- | --- |
| Highly saturated copolymer rubber/EPDM | 100 |
| Zinc oxide | 5 |
| Stearic acid | 1 |
| Sulfur (325 mesh) | 0.5 |
| SRF carbon black | 60 |
| Dioctyl phthalate | 5 |
| Tetramethylthiuram disulfide | 1.5 |

TABLE 1-continued

| Ingredients | Amount (parts by weight) |
| --- | --- |
| N-cyclohexyl-2-benzothiazyl-sulfenamide | 1.5 |
| Octylated diphenylamine | 1 |

(3) Properties of rubber vulcanizate
(i) Tensile strength (kgf/cm$^2$)

(3) Properties of Rubber Vulcanizate (i) Tensile strength (kgf/cm$^2$)

According to Japanese Industrial Standard (JIS). K6301, an unvulcanized rubber formulation prepared according to the recipe shown in Table 1 was vulcanized at a temperature of 160° C. for 20 minutes to give a sheet having a thickness of 2 mm. A #3 dumbbell specimen was cut out from the sheet, and the tensile strength was measured.

(ii) Elongation at break (%)

Elongation was measured on a specimen prepared by the same procedure as that for the determination of tensile strength.

(iii) Tensile stress at 100% elongation (kgf/cm$^2$)

Tensile stress at 100% elongation was measured on a specimen prepared by the same procedure as that for the determination of tensile strength.

(iv) Hardness (JIS)

Hardness was measured by using a JIS spring-type A hardness tester.

(v) Compression set (%)

Compression set was measured after the specimen was maintained at a temperature of 120° C. for 22 hours.

(vi) oil resistance (volume change in %)

Oil resistance was evaluated according to JIS K6301 by the volume change (%) as measured after immersion of the specimen in a #3 lubricating oil having a kinetic viscosity of 31.9 to 34.1, an aniline point of 68.5° to 70.5° C. and a flash point of 162.7 at a temperature of 120° C. for 72 hours.

(vii) Cold resistance (T$_{10}$ in °C.)

Cold resistance was evaluated according to JIS K6301 by a Gehman tortional test method, and expressed by the temperature (T$_{10}$ in °C.) at which the tortion angle reached 10 times of the tortion angle as measured at 23° C. The lower the T$_{10}$, the better the cold resistance.

(viii) Ozone resistance (weather resistance)

Ozone resistance was evaluated according to JIS K6301 as follows. A sample was immersed in Fuel C (i.e., a mixed liquid composed of 50% by volume of isooctane and 50% by volume of toluene) at a temperature of 40° C. for 168 hours, and then air-dried at room temperature for one week. The dried sample was elongated by 20% under static conditions at an ozone concentration of 40 pphm and a temperature of 40° C., allowing to stand for 12 hours, 48 hours and 72,hours, and thereafter the crack formation was observed.

(ix) Heat aging resistance

Heat aging resistance was evaluated according to JIS K6301 by allowing to stand at a temperature of 120° C. for 72 hours and thereafter measuring the tensile strength, elongation at break and hardness, and expressed by the change of these properties.

EXAMPLES 1–8

A reactor having an inner volume of 10 liters was charged with 2 parts of potassium cleats as an emulsifier, 0.1 part of potassium phosphate as a stabilizer and 150 parts of water, and further, butadiene, acrylonitrile and 2,2',4,6,6'-pentamethylheptane-4-thiol (hereinafter abbreviated to "PMHT") as a molecular weight modifier (the amounts of these ingredients are shown in Table 2) were added. By incorporating 0.015 part of ferrous sulfate as an activator and 0.05 part of p-menthane hydroperoxide, an emulsion polymerization was commenced at a temperature of 10° C.

In the preparation of part of acrylonitrile-butadiene copolymers, when the conversion reached to a predetermined value shown in Table 2, acrylonitrile (preparation of copolymers I–IV), butadiene (preparation of copolymer V) and PMHT (preparation of copolymers I–V) were additionally incorporated in the polymerization mixture. When the conversion reached a predetermined value shown in Table 2, 0.2 part of hydroxylamine sulfate per 100 parts of the monomers was added to terminate polymerization. Then the polymerization mixture was heated and subjected to a steam distillation at about 70° C. under a reduced pressure to recover residual monomers. As an aging stabilizer 2 parts of an alkylated phenol was added to obtain a copolymer latex.

To this copolymer latex, 0.25 part of an oxyethylene-oxypropylene adduct to an alkylphenol-formaldehyde condensate (Latemul, NP-5150) as a nonionic surface active agent was added. Then the copolymer latex was incorporated dropwise into a 5 liter-Volume coagulating vessel, equipped with a stirrer, having charged with an aqueous coagulating solution containing 3 parts of aluminum sulfate as a coagulating agent. The latex-incorporated coagulating solution was maintained at 50° C. to coagulate the copolymer. The thus-obtained crumbs were taken out, and washed with water and then dried at 50° C. under a reduced pressure to obtain acrylonitrile-conjugated diene copolymers I to V.

The copolymer was dissolved in methyl isobutyl ketone and then hydrogenated by using a palladium/silica catalyst in a pressure vessel to obtain each of nitrile group-containing highly saturated copolymer rubbers I–V.

The polymerization conditions, bound acrylonitrile content, bound butadiene content and concentration of an alkylthio group in the copolymer before hydrogenation and Mooney viscosity and other characteristics of the copolymer after hydrogenation are shown in Table 2.

According to the recipe shown in Table 1, the highly saturated copolymer rubber was kneaded together by a Banbury mixer to obtain a rubber composition. The rubber composition was subjected to press vulcanization at 160° C. for 20 minutes, and the physical properties of the vulcanizate were evaluated. The results are shown in Table 3.

In these examples, an ethylene-propylene-ethylidene norbornene terpoymer (EPDM) having an iodine value of 24 (EPT-4070, supplied by Mitsui Petrochemical Co.) was used as the ethylenically saturated copolymer rubber.

COMPARATIVE EXAMPLES 1–3

Butadiene and acrylonitrile were copolymerized by the same procedures as employed in Examples 1, 2 and 5, except that commercially available t-dodecyl mercaptan was used as a molecular weight modifier instead of PMHT, and butadiene, acrylonitrile and the molecular weight modifier were charged at a time in the reactor before commencement of polymerization. The obtained copolymers were hydrogenated to obtain nitrile group-containing highly saturated copolymer rubbers VI–VIII. The results of evaluation of these copolymers and hydrogenated products thereof are shown in Table 2. The copolymer rubbers were made into rubber sheets, followed by press vulcanization. The properties the thus-obtained vulcanizates are shown in Table 3.

Figure 1:
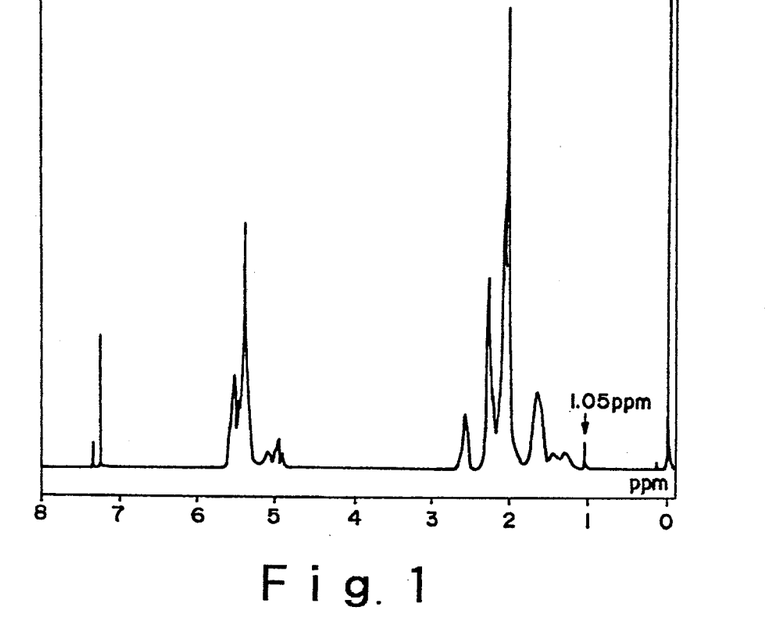
FIG. 1 is a chart of $^1$H-NMR determination of an unsaturated nitrile-conjugated diene copolymer I prepared in Example 1, hereinafter described.
Figure 2:
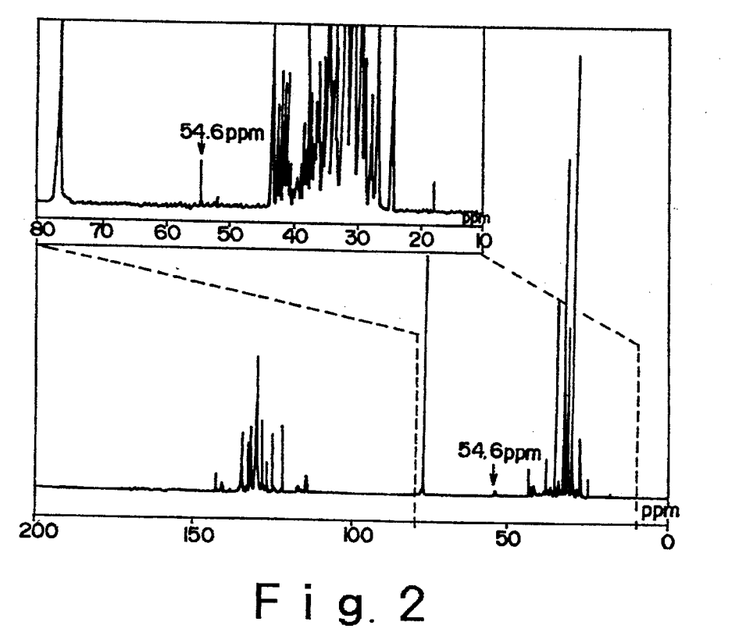
FIG. 2 is a chart of $^{13}$C-NMR determination of the unsaturated nitrile-conjugated diene copolymer I prepared in Example 1.
Figure 3:
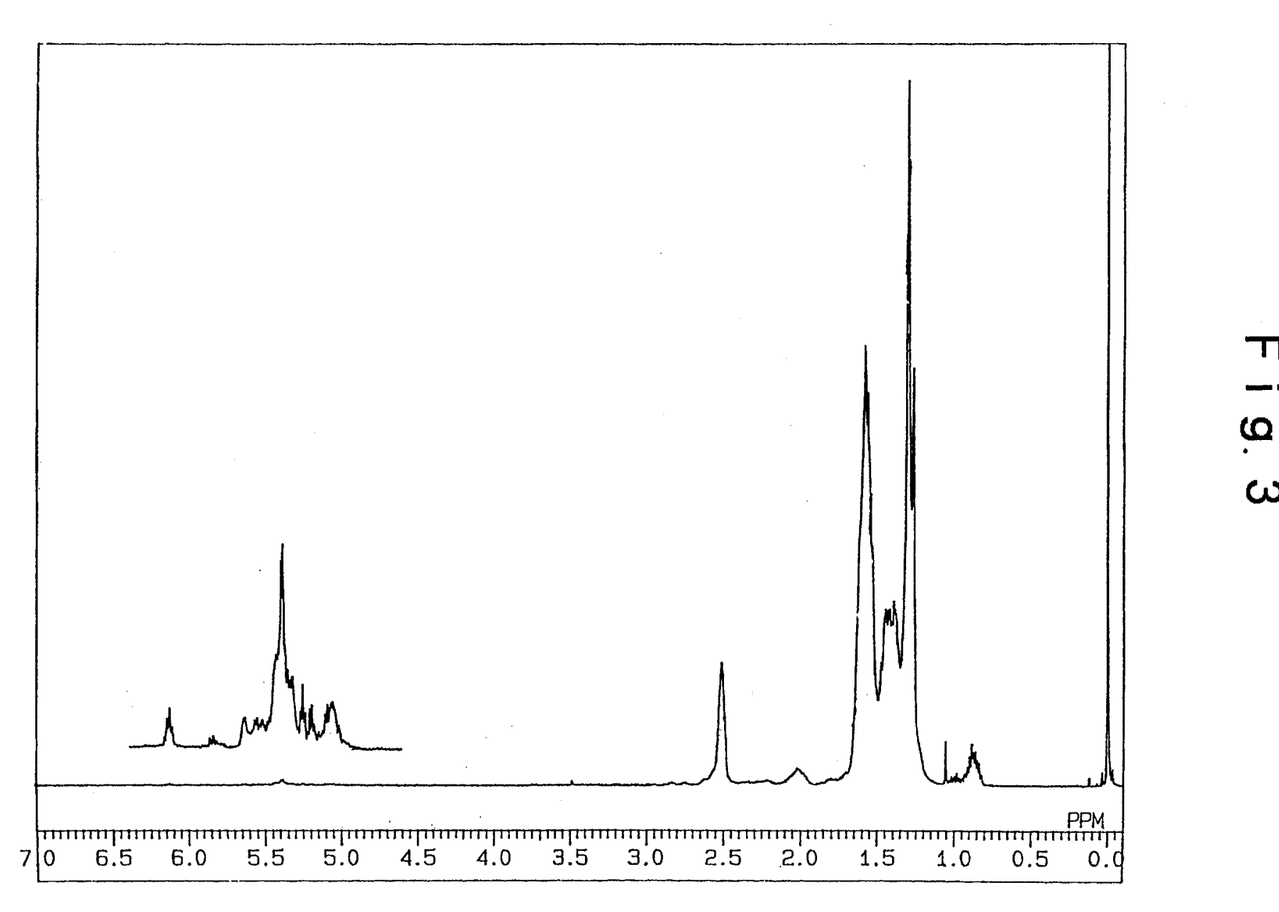
FIG. 3 is a chart of $^1$H-NMR determination of a nitrile group-containing highly saturated copolymer rubber obtained by hydrogenating the unsaturated nitrile-conjugated diene copolymer I prepared in Example 1.

A chart of $^1$H-NMR determination of the unsaturated nitrile-conjugated diene copolymer I in shown in FIG. 1, and a chart of $^{13}$C-NMR determination of the unsaturated nitrile-conjugated diene copolymer I is shown in FIG. 2. A chart of $^1$M-NMR determination of the hydrogenation product (i.e., the nitrile group-containing highly saturated copolymer rubber) of the unsaturated nitrile-conjugated diene copolymer I is shown in FIG. 3.

NMR determinations of the other unsaturated nitrile-conjugated diene copolymers II to V revealed that these copolymers also had a 1,1-di(2,2'-dimethylpropyl)-1-ethylthio group.

TABLE 2

| Hydrogenated copolymer | I | II | III | IV | V | VI | VII | VIII |
|---|---|---|---|---|---|---|---|---|
| Hydrogenated copolymer | | | | | | | | |
| Iodine value | 15 | 5 | 15 | 30 | 15 | 15 | 15 | 15 |
| Mooney viscosity | 72 | 86 | 81 | 73 | 78 | 68 | 78 | 76 |
| Copolymer before hydrogenation | | | | | | | | |
| Bound butadiene (%) | 66 | 56 | 56 | 56 | 50 | 66 | 56 | 50 |
| Bound acrylonitrile (%) | 34 | 44 | 44 | 44 | 50 | 34 | 44 | 50 |
| Concentration of | | | | | | | | |
| alkylthio group (mole %) | 0.09 | 0.08 | 0.09 | 0.085 | 0.09 | — | — | — |
| ΔAN | 9 | 9 | 8 | 8 | 8 | 21 | 20 | 20 |
| Fraction of Mn ≦ 35,000 (%) | 12 | 13 | 12 | 12 | 13 | 3 | 3 | 3 |
| Polymerization conditions | | | | | | | | |
| Monomers | | | | | | | | |
| Butadiene | | | | | | | | |
| Amount charged (parts) | 71 | 40 | 40 | 40 | 20 | 67 | 50 | 40 |
| Amount added (parts) | — | — | — | — | 10[42] | — | — | — |
| [Conversion on addition] (%) | | | | | 10[60] | | | |
| Acrylonitrile | | | | | | | | |
| Amount charged (parts) | 22 | 5 | 5 | 5 | 60 | 33 | 50 | 60 |
| Amount added (parts) | 4[35] | 9[60] | 9[60] | 9[60] | — | — | — | — |
| [Conversion on addition] (%) | 3[55] | | | | | | | |
| MW modifier | | | | | | | | |
| PMHT | | | | | | | | |
| Amount charged (parts) | 0.28 | 0.28 | 0.28 | 0.28 | 0.28 | — | — | — |
| Amount added (parts) | 0.17 | 0.17 | 0.17 | 0.17 | 0.17 | — | — | — |
| [Conversion an addition] (%) | [50] | [50] | [50] | [50] | [50] | — | — | — |
| TDM | | | | | | | | |
| Amount charged (parts) | — | — | — | — | — | 0.45 | 0.45 | 0.45 |
| Polymerization time (hr) | 13 | 13 | 13 | 13 | 14 | 13 | 15 | 15 |
| Conversion on termination (%) | 75 | 80 | 80 | 80 | 75 | 80 | 90 | 85 |

Molecular weight modifier: PMHT = 2,2$^1$,4,6,6'-Pentamethylheptane-4-thiol
TDM = tert-Dodecylmercaptan

TABLE 3

| | Examples | | | | | | | | Comparative Examples | | |
|---|---|---|---|---|---|---|---|---|---|---|---|
| | 1 | 2 | 3 | 4 | 5 | 6 | 7 | 8 | 1 | 2 | 3 |
| Hydrogenated copolymer | I | II | III | III | III | III | IV | V | VI | VII | VIII |
| Highly saturated copolymer/ | | | | | | | | | | | |
| EPDM | 50/50 | 50/50 | 90/10 | 70/30 | 50/50 | 30/70 | 50/50 | 50/50 | 50/50 | 50/50 | 50/50 |
| High-speed vulcanizability | | | | | | | | | | | |
| Scorch time T$_5$ (min) | 3.1 | 3.2 | 3.1 | 3.1 | 3.0 | 2.8 | 2.6 | 2.8 | 4.0 | 4.1 | 4.1 |
| Maximum torque V$_{max}$ (kgf.cm$^2$) | 70 | 65 | 71 | 71 | 73 | 74 | 76 | 74 | 59 | 61 | 62 |
| Physical properties in ordinary state | | | | | | | | | | | |
| Tensile strength (kgf/cm$^2$) | 178 | 203 | 246 | 223 | 168 | 170 | 179 | 191 | 161 | 165 | 168 |
| Elongation at break (%) | 510 | 580 | 500 | 490 | 490 | 480 | 410 | 490 | 480 | 490 | 490 |
| Tensile stress at 100% | | | | | | | | | | | |
| elongation (kgf/cm$^2$) | 40 | 32 | 39 | 39 | 41 | 43 | 47 | 42 | 31 | 33 | 33 |
| Hardness (JIS) | 72 | 72 | 74 | 74 | 74 | 74 | 76 | 75 | 70 | 72 | 73 |

TABLE 3-continued

| Hydrogenated copolymer | Examples | | | | | | | | Comparative Examples | | |
|---|---|---|---|---|---|---|---|---|---|---|---|
| | 1<br>I | 2<br>II | 3<br>III | 4<br>III | 5<br>III | 6<br>III | 7<br>IV | 8<br>V | 1<br>VI | 2<br>VII | 3<br>VIII |
| Compression set (%) | 38 | 50 | 35 | 37 | 38 | 38 | 32 | 40 | 62 | 64 | 61 |
| Oil resistance | | | | | | | | | | | |
| (volume change) (%) | +82 | +61 | +21 | +46 | +67 | +95 | +58 | +40 | +86 | +71 | +62 |
| Cold resistance | | | | | | | | | | | |
| (Gehman $T_{10}$) (°C.) | −32 | −26 | −23 | −25 | −28 | −30 | −28 | −20 | −29 | −25 | −18 |
| Heat aging resistance | | | | | | | | | | | |
| Change of tensile stress | +3 | +1 | 0 | +2 | +3 | +2 | +3 | −1 | +3 | −2 | −3 |
| Change of elongation | −18 | −13 | −23 | −20 | −18 | −17 | −28 | −26 | −23 | −25 | −25 |
| Change of hardness | +2 | +2 | +2 | +2 | +2 | +1 | +3 | +3 | +2 | +2 | +3 |
| Ozone resistance *1 | | | | | | | | | | | |
| 12 hr | NC | NC | NC | NC | NC | NC | NC | NC | NC | NC | NC |
| 48 hr | NC | NC | NC | NC | NC | NC | NC | NC | NC | NC | NC |
| 72 hr | NC | NC | NC | NC | NC | NC | NC | NC | NC | NC | NC |
| Mold contamination | 1 | 1 | 1 | 1 | 1 | 1 | 1 | 1 | 3 | 3 | 3 |

*1 NC: Crack formation was not observed

As seen from Table 3, the vulcanized rubber composition comprising each of the nitrile group-containing highly saturated copolymer rubbers I to V and an ethylenically saturated copolymer rubber (Examples 1 to 8) exhibits a short scorch time ($T_5$) and an increased maximum torque ($V_{max}$), as measured by using an oscillating disc rheometer. Thus the rubber composition has an excellent high-rate vulcanizability. This leads to a vulcanizate having a high tensile stress at 100% elongation, a high strength, a high hardness and a reduced compression set. Thus the vulcanization efficiency is high. The rubber composition of the present invention is suitable for injection molding, and exhibits an enhanced productivity and is labor-saving in molding.

The ozone resistance and weather resistance are at a high level. The heat aging resistance also is good and therefore the heat resistance is satisfactory. Further, the highly saturated copolymer rubber prepared by the above-mentioned coagulation method using a halogen-free coagulating agent does not contain halogens and thus does not cause a problem of metal corrosion. A problem of mold contamination also does not arise.

Copolymers I to V are prepared by adding acrylonitrile or butadieus in lots during polymerization, and therefore, these copolymers exhibit a low ΔAN, a small $T_{10}$ as measured by the Getman tortional test and a reduced change in volume after immersion in an oil, as compared with copolymers VI to VIII prepared by charging the monomers at once before the commencement of polymerization. Namely copolymers I to V have good and balanced oil resistance and cold resistance while keeping a high mechanical strength.

Further copolymers I to V are prepared by adding PMHT (molecular weight modifier) in lots during polymerization, and therefore, the highly saturated copolymer rubbers contain a relatively large amount of a fraction having a number average molecular weight (Mn) of not larger than 35,000, and thus exhibit good and balanced processability and mechanical strength.

In contrast, copolymers VI to VIII, which are prepared by using t-dodecyl mercaptan, i.e., a conventional and commercially available molecular weight modifier widely used in radical polymerization, exhibit a poor high-rate vulcanizability, a low mechanical strength and a large compression set. The mold contamination is undesirably large.

NMR determination of these copolymers VI to VIII revealed that a 1,1-di(2,2-dimethylpropyl)-1-ethylthio group was not present in these copolymers.

The rubber composition of the present invention comprising the nitrile group-containing highly saturated copolymer rubber and an ethylenically saturated copolymer rubber has excellent high-rate vulcanizability, and a vulcanizate made therefrom exhibits good mechanical strength, compression set, oil resistance and cold resistance. Therefore, the rubber composition can be used as raw material for various vibration insulators, electrical and electronic parts, automobile parts, industrial materials and parts, and footwears. For example, the rubber composition is used for sealing materials such as an O-ring, a gasket, an oil seal and a Freon seal; belts such as an automobile V belt, a poly-rib belt and a toothed power transmission belt; hoses such as an automobile fuel hose, as an automobile power steering hose, and high-pressure oil-resistant hoses such as oil pressure hoses for various machines, e.g., a construction machine; rolls; rubber articles for gas wells such as a packer, a blow-out preventor (BOP) and a pipe-protector; diaphragms; and an automobile clutch plate and an automobile brake shoe (these parts are made from a mixed material of the highly saturated rubber of the invention and a thermosetting resin such as a phenol resin or an epoxy resin).

Where the highly saturated copolymer rubber is made from an unsaturated nitrile-conjugated diene copolymer having an ethylenically unsaturated carboxylic acid monomer copolymerized therein, and a rubber composition is comprised of the highly saturated copolymer rubber and an oxide of a metal of group II of the periodic table, an vulcanizate of the rubber composition has excellent dynamid fatigue resistance, and therefore, is useful especially for articles which are repeatedly distorted when used, such as belts including a power transmitting belt.

The nitrile group-containing highly saturated copolymer rubber can be used as an aqueous emulsion. Both vulcanized film and unvulcanized film, which are made from the aqueous emulsion, have a high mechanical strength and good oil resistance and cold resistance, and therefore, they are used as binders for non-woven fabrics, impregnated paper, oil-resistant impregnated articles, foamed rubbery articles, shirring and cork. The aqueous emulsion is further

What is claimed is:

1. A rubber composition comprising:
   (i) a nitrile group-containing highly saturated copolymer rubber, which is a product obtained by hydrogenating the conjugated diene portion of an unsaturated nitrile-conjugated diene copolymer, and
   (ii) an ethylenically saturated copolymer rubber which is comprised of ethylene units, units of an α-olefin having 3 to 14 carbon atoms and non-conjugated diene units;
   said nitrile group-containing highly saturated copolymer rubber (i) having an alkylthio group having 12 to 16 carbon atoms, which include at least three tertiary carbon atoms, and having a sulfur atom which is directly bound to at least one of the tertiary carbon atoms; and said highly saturated copolymer rubber (i) further having a Mooney viscosity of 15 to 200 and an iodine value not larger than 80.

2. A rubber composition as claimed in claim 1, wherein the ratio of (i) said nitrile group-containing highly saturated copolymer rubber to (ii) said ethylenically saturated copolymer rubber is in the range of 95/5 to 20/80 by weight.

3. A rubber composition as claimed in claim 1, wherein said highly saturated copolymer rubber has at least 0.03 m61e, per 100 moles of the monomeric units constituting the molecule, of said alkylthio group.

4. A rubber composition as claimed in claim 1, wherein said highly saturated copolymer rubber has 0.07 to 0.3 mole, per 100 moles of the monomeric units constituting the molecule, of said alkylthio group.

5. A rubber composition as claimed in claim 1, wherein said alkylthio group is at least one member selected from the group consisting of 1,1-di(2,2-dimethyipropyl)-1-ethylthio group and a 1-(2,2-dimethylpropyl)-1-(2,2,4,4-tetramethylpentyl)-1-ethylthio group.

6. A rubber composition as claimed in claim 1, wherein said alkylthio group is 1,1-di(2,2-dimethylpropyl)-1-ethylthio group.

7. A rubber composition as claimed in claim 1, wherein said highly saturated copolymer rubber contains 10 to 60% by weight, based on the weight of the copolymer rubber, of bound unsaturated nitrile units.

8. A rubber composition as claimed in claim 1, wherein said unsaturated nitrile-conjugated diene copolymer is comprised of 10 to 60% by weight of acrylonitrile units, 90 to 40% by weight of buts diene units and 0 to 80% by weight of copolymerizable monomer units, and said nitrile group-containing highly saturated copolymer rubber has a Mooney viscosity of 20 to 90.

9. A rubber composition as claimed in claim 1, wherein said unsaturated nitrile-conjugated diene copolymer contains 3 to 20% by weight of a fraction having a number average molecular weight (Mn) of not larger than 35,000.

10. A rubber composition as claimed in claim 1, wherein the ratio (Mw/Mn) Of the weight average molecular weight (Mw) to the number average molecular weight (Mn) of said unsaturated nitrile-conjugated diene copolymer is in the range of 2.3 to 5.5.

11. A rubber composition as claimed in claim 1, wherein the breadth (AAN) of compositional distribution of the unsaturated nitrile in said unsaturated nitrile-conjugated diene copolymer is not larger than 35.

12. A rubber composition as claimed in claim 1, wherein the breadth (ΔAN) of compositional distribution of the unsaturated nitrile in said unsaturated nitrile-conjugated diene copolymer is in the range of 3 to 20.

13. A rubber composition as claimed in claim 1, wherein said unsaturated nitrile-conjugated diene copolymer does not contain a halogen or contains smaller than 3 ppm of halogens.

14. A rubber composition as claimed in claim 1, wherein said unsaturated nitrile-conjugated diems copolymer comprises 1 to 80% by weight, based on the weight of the unsaturated nitrile-conjugated diene copolymer, of units of an unsaturated carboxylic acid ester or a combination of an unsaturated carboxylic acid ester with a fluorine-containing vinyl monomer.

15. A rubber composition as claimed in claim 1, wherein, in said ethylenically saturated copolymer rubber, the ratio of the ethylene units to the α-olefin units is in the range of 50/50 to 90/10 by weight, and the ratio of the sum of the ethylene units plus the α-olefin units to the non-conjugated diene units is in the range of 98/2 to 90/10 by weight.

16. A rubber composition as claimed in claim 1, wherein 8aid ethylenically saturated copolymer rubber has a Mooney viscosity of 10 to 180 and an iodine value of not larger than 20.

17. A rubber composition as claimed in claim 1, wherein said saturated copolymer rubber has a degree of crystallinity not larger than 20%.

18. A rubber composition as claimed in claim 1, wherein said α-olefin is propylene, and said non-conjugated diene is selected from the group consisting of ethylidene-norbornene and dicyclopentadiene.

19. A rubber composition as claimed in claim 1, which further comprises 0.01 to 10 parts by weight of a sulfur-containing vulcanizer, based on 100 parts by weight of the sum of the nitrile group-containing highly saturated copolymer rubber plus the ethylenically saturated copolymer rubber.

20. A rubber composition as claimed in claim 1, wherein said unsaturated nitrile-conjugated diene copolymer used for the preparation of the nitrile group-containing highly saturated copolymer rubber contains 0.1 to 15% by weight, based on the weight of the copolymer, 0f ethylenically unsaturated carboxylic acid monomer units; and said rubber composition further comprising 0.5 to 30 parts by weight, per 1.00 parts by weight of the sum of the nitrile group-containing highly saturated copolymer rubber plus the ethylenically saturated copolymer rubber, of an oxide of a metal of group II of the periodic table.

21. A rubber composition as claimed in claim 1, which is in the form of an injection-molded article.

22. A rubber composition as claimed in claim 1, which is in the form of an O-ring.

* * * * *

UNITED STATES PATENT AND TRADEMARK OFFICE
CERTIFICATE OF CORRECTION

PATENT NO.: 5,556,919
DATED    :    SEPTEMBER 17, 1996
INVENTORS:    Motofumi OYAMA et al

It is certified that error appears in the above-identified patent and that said Letters Patent is hereby corrected as shown below:

Column 12, line 34, delete "(12) Contamination of mold" and insert therefor --(2) Contamination of mold--.

Signed and Sealed this

Eleventh Day of March, 1997

*Attest:*

BRUCE LEHMAN

*Attesting Officer*      Commissioner of Patents and Trademarks